(12) United States Patent
Ryang

(10) Patent No.: US 7,410,631 B2
(45) Date of Patent: *Aug. 12, 2008

(54) METAL PHOSPHATE SOLS, METAL NANOPARTICLES, METAL-CHALCOGENIDE NANOPARTICLES, AND NANOCOMPOSITES MADE THEREFROM

(75) Inventor: Hong-Son Ryang, Camarillo, CA (US)

(73) Assignee: APS Laboratory, Camarillo, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 11/070,626

(22) Filed: Mar. 2, 2005

(65) Prior Publication Data

US 2006/0199886 A1  Sep. 7, 2006

(51) Int. Cl.
*C01B 17/20* (2006.01)
*C01B 19/04* (2006.01)

(52) U.S. Cl. ............... 423/509; 423/566.1; 423/104

(58) Field of Classification Search ............ 423/509, 423/561.1, 566.1, 104
See application file for complete search history.

(56) References Cited

U.S. PATENT DOCUMENTS

| | | | |
|---|---|---|---|
| 4,980,427 A | 12/1990 | Ryang | |
| 5,908,608 A | 6/1999 | Lawandy et al. | |
| 5,962,608 A | 10/1999 | Ryang et al. | |
| 6,169,119 B1 | 1/2001 | Ryang et al. | |
| 6,261,687 B1 | 7/2001 | Ryang et al. | |
| 6,500,871 B1 | 12/2002 | Gerardin et al. | |
| 6,579,472 B2 | 6/2003 | Chung et al. | |
| 7,264,874 B2 * | 9/2007 | Ryang | 428/402 |
| 2001/0056141 A1 | 12/2001 | Schutt | |
| 2003/0024432 A1 | 2/2003 | Chung et al. | |
| 2003/0133890 A1 | 7/2003 | Kauffman et al. | |
| 2003/0144469 A1 | 7/2003 | Kauffman et al. | |

* cited by examiner

*Primary Examiner*—Robert D. Harlan
(74) *Attorney, Agent, or Firm*—Amin, Turocy & Calvin, LLP

(57) ABSTRACT

Disclosed are metal phosphate sols made by mixing at least one metal oxide, at least one phosphate precursor, at least one organosilane, and a liquid. Also disclosed are nanocomposites containing the metal phosphate sols and at least one of metal nanoparticle and metal-chalcogenide nanoparticle. The nanocomposites containing metal nanoparticles may be chalcogenized to provide nanocomposites containing metal-chalcogenide nanoparticles. Also disclosed are composites containing a dielectric material such as a polymer and at least one of the metal phosphate sol and the nanocomposite.

21 Claims, No Drawings

METAL PHOSPHATE SOLS, METAL NANOPARTICLES, METAL-CHALCOGENIDE NANOPARTICLES, AND NANOCOMPOSITES MADE THEREFROM

FIELD OF THE INVENTION

The subject invention generally relates to metal phosphate sols, metal phosphate sol hosted guest metal nanoparticles, metal phosphate sol hosted guest metal-chalcogenide nanoparticles, and polymers containing the metal phosphate sols, polymers containing the metal phosphate sol hosted guest metal nanoparticles, polymers containing the metal phosphate sol hosted guest metal-chalcogenide nanoparticles, and related methods. In particular, the subject invention relates to stable metal phosphate sols, stable nanocomposites of host metal phosphate sols and guest metal nanoparticles, and stable nanocomposites of host metal phosphate sols and guest metal-chalcogenide nanoparticles that can be uniformly incorporated into a dielectric matrix.

BACKGROUND OF THE INVENTION

In the last century, synthetic polymers have revolutionized the way in which we live. From synthetic rubber used in tires, structural plastic used in transportation systems, to field responsive polymers used in optical and electrical devices, synthetic polymers are used everywhere. A myriad of products and components for products are made, at least in part, of a polymer material. As the uses for polymers continue to increase, it becomes more and more desirable to improve the properties of polymers.

For example, silica, graphite, carbon black, and clay among many other materials have been incorporated into polymers in attempts to improve the properties of the resultant composites. While improvements have been realized, further improvements are desired.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The subject invention provides very stable metal phosphate sols. The stable metal phosphate sols can be uniformly incorporated into various dielectrics such as polymer systems on a molecular level thereby improving one or more of the dielectric properties. The subject invention thus also provides dielectric compositions with one or more of improved strength, improved corona resistance, improved plasma resistance, improved resistance to organic solvents, improved high temperature stability, improved flame retardancy, improved oxidative stability, refractive index modification, improved fracture properties, improved abrasion resistance, improved liquid permeability, improved gas permeability including improved gas permeability to specific gases, improved (low) hysteresis loss (low rolling resistance), and the like. When used with a translucent polymer or translucent glass, the resulting polymer or glass composition remains clear or translucent.

One aspect of the invention relates to metal phosphate sols compositions made by mixing certain amounts of at least one metal oxide; at least one phosphate precursor; at least one organosilane; and a liquid. The host metal phosphate may be made by mixing the metal oxide; the phosphate precursor; the organosilane; the liquid; at least one acid or base catalyst and at least one boron oxide compound. The metal phosphate sols compositions may be dried metal phosphate sols compositions containing no substantial amounts of water or organic solvent.

Another aspect of the invention relates to composite compositions containing a major amount of a dielectric material and a minor amount of a metal phosphate sol dispersed within the dielectric material, the metal phosphate sol containing at least one metal oxide, at least one phosphate precursor; and at least one organosilane. Yet other aspects of the invention relate to methods of making the metal phosphate sol compositions and the dried metal phosphate sol compositions.

The subject invention also provides very stable nanocomposites of host metal oxide sols and at least one of guest metal nanoparticle and guest metal-chalcogenide nanoparticle having a controlled particle size. The stable nanocomposites can be uniformly incorporated into various dielectrics such as polymer systems on a molecular level thereby improving one or more of the dielectric properties. The subject invention thus also provides dielectric compositions with one or more of improved strength, improved corona resistance, improved plasma resistance, improved resistance to organic solvents, improved high temperature stability, improved flame retardancy, improved oxidative stability, refractive index modification, improved fracture properties, improved abrasion resistance, improved liquid permeability, improved gas permeability including improved gas permeability to specific gases, improved (low) hysteresis loss (low rolling resistance), improved corrosion protection, improved optical and electrical performance, and the like. When used with a translucent polymer or translucent glass, the resulting polymer or glass composition remains clear or translucent.

One aspect of the invention relates to nanocomposites containing at least one of guest metal nanoparticle and guest metal-chalcogenide nanoparticle, such as a noble or non-noble metal or a noble or non-noble metal-chalcogenide, and host metal phosphate sols made by mixing at least one metal oxide; at least one phosphate precursor; at least one organosilane; and a liquid. The host metal phosphate sols may be made by mixing the metal oxide; the phosphate precursor; the organosilane; the liquid; optionally at least one acid or base catalyst; and at least one boron oxide compound. The guest metal nanoparticles may be chalcogenized during or after mixing the metal oxide, the phosphate precursor, the organosilane, and the liquid to provide metal phosphate sol.

Another aspect of the invention relates to dried nanocomposite containing at least one of guest metal nanoparticle and guest metal-chalcogenide nanoparticle and host metal phosphate sols made by mixing at least one metal oxide; at least one phosphate precursor; at least one organosilane; and with substantially no liquid/water. The dried nanocomposite is typically in powder form.

Yet another aspect of the invention relates to dielectric composites containing a dielectric material and a nanocomposite substantially uniformly dispersed therein.

Still yet other aspects of the invention relate to methods of making a nanocomposite. The method involves mixing at least one of guest metal nanoparticle and metal-chalcogenide nanoparticle; at least one metal oxide; at least one phosphate precursor; at least one organosilane; and a liquid to provide the nanocomposite. The method may involve mixing at least one guest metal nanoparticle; at least one metal oxide; at least one phosphate precursor; at least one organosilane; and a liquid to provide the host-guest metal phosphate sol, and chalcogenizing the host-guest metal phosphate sol to provide metal-chalcogenide nanocomposite. The method may further involve optionally mixing at least one acid or base catalyst and/or at least one boron oxide compound to provide the nanocomposites.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The metal phosphate sols of the subject invention are prepared by combining certain relative amounts of at least three components: at least one metal oxide compound, at least one phosphate precursor, and at least one organosilane with a liquid such as water and/or an organic solvent. The metal phosphate sols of the subject invention can be prepared by combining certain relative amounts of four components: at least one metal oxide compound, at least one phosphate precursor, at least one organosilane, and at least one boron oxide compound with a liquid such as water and/or an organic solvent to provide clear metal phosphate sols. The metal phosphate sols of the subject invention are stable over a long period of time, may be stored in a dry state, and are compatible with dielectric systems.

The stable nanocomposites of the subject invention contain host metal phosphate sols and at least one of guest metal nanoparticle and metal-chalcogenide nanoparticle, such as a noble or non-noble metal nanoparticle or a noble or non-noble metal-chalcogenide nanoparticle. Although not wishing to be bound by any theory, it is believed that the metal phosphate sols act as hosts for individual guest metal atoms and clusters of guest metal atoms. Extensive aggregation and/or precipitation of guest metal is thereby mitigated. The host metal phosphate sols also play an important role in improving the compatibility of the resulting nanocomposites with dielectric materials. The nanocomposites can be stored in a stable manner in liquid/sol form or in powder/dry form. The nanocomposites are thermally stable, thereby facilitating their use in dielectric systems.

The host metal phosphate sols contribute to the stability of the nanoparticles; that is, at least partly owing to the presence of the metal phosphate sols the nanoparticles are stable over a long period of time, may be stored in a dry state, and are compatible with dielectrics such as polymer systems.

A "sol", as the term is used herein, refers to a composition containing a liquid colloidal dispersion containing a liquid phase and a dispersed phase. The liquid phase of the liquid colloidal dispersion may be aqueous and/or organic. The liquid phase may also be a liquid or partially liquid substance to which a metal phosphate sol can be added, such as resin monomers. For example, in the case where it is desired to incorporate nanocomposites into a polymer, the liquid phase of the metal phosphate sols may be constituted by a polymer monomer in liquid form. A "dried sol" or "dried nanocomposite" results when the liquid phase of a sol is removed.

The term "hydrocarbyl" as used herein includes hydrocarbon as well as substantially hydrocarbon groups. Substantially hydrocarbon describes groups which contain heteroatom substituents which do not alter the predominantly hydrocarbon nature of the group. Examples of hydrocarbyl groups include hydrocarbon substituents, i.e., aliphatic (e.g., alkyl or alkenyl) and substituted aliphatic substituents, alicyclic (e.g., cycloalkyl, cycloalkenyl) substituents, aromatic-, aliphatic- and alicyclic-substituted aromatic substituents, fluorocarbon groups, polysiloxanes, and alkylates. Heteroatoms include, by way of example, fluorine, nitrogen, oxygen, silicon, phosphorus, and sulfur.

Metal oxide compounds include a metal and at least one alkoxide group or carboxylate group. Metal oxides include metal methoxides, metal ethoxides, metal isopropoxides, metal propoxides, metal butoxides, metal ethylhexoxides, metal (triethanolaminato)isopropoxides, chelated metal alkoxides such as metal bis(2,4-pentanedionate)diisopropoxides, metal bis(ethyl acetoacetato)diisopropoxides, and metal trifluoroacetylacetonates. Metal oxides also include at least one of transition metal alkoxides, post-transition metal alkoxides, alkali metal alkoxides, and alkaline earth metal alkoxides.

The metal of the metal oxide compounds include at least one transition metal and/or alkaline earth metal and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. Alkali metals include Li, Na, K, Rb and Cs. Alkaline earth metals include Be, Mg, Ca, Sr and Ba. In one embodiment, the metal of the metal oxide compound is at least one of aluminum, titanium and zirconium.

Metal oxide compounds are commercially available or can be made from precursor compounds such as transition metal halides, alkaline earth metal halides, post-transition metal halides, alkali metal halides, transition metal carboxylates, alkaline earth metal carboxylates, post-transition metal carboxylates, alkali metal carboxylates, transition metal nitrates, alkaline earth metal nitrates, post-transition metal nitrates, and alkali metal nitrates.

In one embodiment, metal oxide compounds can be represented by Formula I:

$$M_aO_k(OR)_b \qquad (I)$$

wherein each M is a transition metal, alkaline earth metal, post-transition metal, or alkali metal, each R is independently a hydrogen or a hydrocarbyl group containing from 1 to about 18 carbon atoms (at least one R is a hydrocarbyl group), a is from 1 to about 5, k is 0 to about 10, and b is from 1 to about 20. In some instances, R may be a hydrogen atom provided that at least one or at least two Rs are hydrocarbyl groups containing from 1 to about 8 carbon atoms. In another embodiment, each R is independently a hydrocarbyl group containing from 1 to about 6 carbon atoms, a is from 1 to about 4, k is from 0 to about 3, and b is from 1 to about 6. In yet another embodiment, each R is independently a hydrocarbyl group containing from 1 to about 4 carbon atoms, a is from 1 to about 3, and b is from 1 to about 4.

Specific examples of metal oxide compounds include aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, lanthanum methoxyethoxide, and combinations of two or more of the above compounds.

Metal hydroxides and metal salts such as metal carboxylates, metal halides, and metal nitrates may also be added as the metal oxide compound to make the metal phosphate sols. Metal carboxylates include metal acetates, metal ethylhexanoates, metal gluconates, metal oxalates, metal propionates, metal pantothenates, metal cyclohexanebutyrates, metal bis(ammonium lacto)dihydroxides, metal citrates, and metal methacrylates. The metals are the same metals as the metal alkoxides. Specific examples of metal carboxylates include aluminum lactate, calcium acetate, calcium ethylhexanoate, calcium gluconate, calcium oxalate, calcium propionate, calcium pantothenate, calcium cyclohexanebutyrate, cobalt methoxyethoxide, cobalt acetate, iron alkoxide, iron isopropoxide, magnesium acetate, magnesium methylcarbonate, magnesium gluconate, nickel acetate, tin acetate, tin oxalate, titanium bis(ammonium lacto)dihydroxide, zinc acetate, zinc methacrylate, zinc stearate, zinc cyclohexanebutyrate, zirconium acetate, and zirconium citrate.

Phosphate precursors include alkylphosphates, polyphosphoric acid, and polyphosphoric acid esters. Examples of alkylphosphates may include methylphosphate, ethylphosphate, propylphosphate, butylphosphate, pentylphosphate, hexylphosphate, dimethylphosphate, diethylphosphate, dipropylphosphate, dibutylphosphate dipentylphosphate, methylethylphosphate, ethylbutylphosphate, ethylpropylphosphate, trimethylphosphate, triethylphosphate, tripropylphosphate, tributylphosphate, tripentylphosphate, ethyl dimethylphosphate, and ethyl dibutylphosphate.

Polyphosphoric acid esters include esters of di-, tri-, tetra-, pentaphosphoric acid with a monohydric alcohol and/or polyhydric alcohol. Examples of polyphosphoric acid esters include polyphosphoric acid methyl ester, polyphosphoric acid ethyl ester, polyphosphoric acid propyl ester, polyphosphoric acid butyl ester, polyphosphoric acid pentyl ester, polyphosphoric acid dimethyl ester, polyphosphoric acid diethyl ester, polyphosphoric acid dipropyl ester, polyphosphoric acid dibutyl ester, diphosphoric acid methyethyl ester, diphosphoric acid ethybutyl ester, diphosphoric acid ethylpropyl ester, diphosphoric acid ethylhexyl ester, trialkyl ester of di-, tri- tetra-, penta-phosphoric acid, tetraalkyl ester of di-, tri- tetra-, penta-phosphoric acid, pentaalkyl ester of di-, tri- tetra-, penta-phosphoric acid, and hexaalkyl ester of di-, tri- tetra-, penta-phosphoric acid.

Optionally, phosphonic acids, phosphinic acids, and their esters also can be added in conjunction with the above phosphate precursors to improve solubility. Examples of phosphonic acids include phosphonic acid, methyl phosphonic acid, ethyl phosphonic acid, propyl phosphonic acid, butyl phosphonic acid, pentyl phosphonic acid, and hexyl phosphonic acid. Examples of phosphinic acids include phosphinic acid, methyl phosphinic acid, ethyl phosphinic acid, propyl phosphinic acid, butyl phosphinic acid, pentyl phosphinic acid, and hexyl phosphinic acid. Phosphonic acid esters include esters of phosphonic acid with monohydric alcohol and/or polyhydric alcohol, such as phosphonic acid methyl ester, phosphonic acid ethyl ester, phosphonic acid propyl ester, phosphonic acid butyl ester, phosphonic acid pentyl ester, phosphonic acid dimethyl ester, phosphonic acid diethyl ester, phosphonic acid dipropyl ester, phosphonic acid dibutyl ester, phosphonic acid methyethyl ester, phosphonic acid ethybutyl ester, phosphonic acid ethylpropyl ester, and phosphonic acid ethylhexyl ester. Phosphinic acid esters include esters of phosphinic acid with monohydric alcohol and/or polyhydric alcohol, such as phosphinic acid methyl ester, phosphinic acid ethyl ester, phosphinic acid propyl ester, phosphinic acid butyl ester, phosphinic acid pentyl ester, phosphinic acid dimethyl ester, phosphinic acid diethyl ester, phosphinic acid dipropyl ester, phosphinic acid dibutyl ester, phosphinic acid methyethyl ester, phosphinic acid ethybutyl ester, phosphinic acid ethylpropyl ester, and phosphinic acid ethylhexyl ester.

Alkylphosphates and polyphosphoric acid esters are commercially available. For example, ethylphosphate is available from Acros Organics, Alfa Aesar, and Fluka Chemical Corp. Phosphonic acids, phosphinic acids, and their esters are also commercially available. Phosphonic acid is available from Acros Organics, Alfa Aesar, and Fluka Chemical Corp. Polyphosphoric acid esters, phosphonic acid esters, and phosphinic acid esters can be synthesized by the dehydration of mixtures of alcohol with polyphosphoric acid, phosphonic acid, and phosphinic acid, respectively. For example, phosphonic acid and ethanol can be used to synthesize phosphonic acid ethyl ester.

Organosilanes include compounds represented by Formula II:

$$(R^2)_{4-c}Si(X)_c \quad (II)$$

wherein c is 2 to about 4, each $R^2$ is individually a hydrogen or an organofunctional containing organic group containing from about 1 to about 24 carbon atoms including at least one from the group consisting of heterocyclic, acryloxy, cyano, phosphino, amino, amide, vinyl, epoxy, glycidoxy, alkyl, a carbon carbon triple bond containing group, mercapto, siloxy, halocarbon such as fluorocarbon, and a carbon carbon double bond containing group, and each X is individually a hydrocarbyloxy or alkoxy group containing from 1 to about 8 carbon atoms, or chlorine, bromine, or iodine. Examples of alkoxy groups include methoxy, ethoxy, propoxy and butoxy groups.

Examples of organosilanes include tetramethoxysilane, tetraethoxysilane, tetrapropoxysilane, tetra-n-butoxysilane, and the like, and organofunctional silanes.

Organosilanes include organofunctional silanes, which are compounds represented by Formula III:

$$(R^2)_{4-c}Si(X^2)_c \quad (III)$$

but wherein c is 1 to 4, each $X^2$ is individually an alkoxy group containing from 1 to about 4 carbon atoms, and each $R^2$ is individually a hydrogen or an organofunctional containing organic group containing from about 1 to about 24 carbon atoms including at least one from the group consisting of heterocyclic, acryloxy, cyano, phosphino, amino, amide, vinyl, epoxy, glycidoxy, alkyl, a carbon carbon triple bond containing group, mercapto, siloxy, halocarbon such as fluorocarbon, and a carbon carbon double bond containing group. In another embodiment, c is 2 or 3, $X^2$ is individually an alkoxy group containing from 1 to about 2 carbon atoms, and each $R^2$ is individually an organofunctional containing organic group containing from about 2 to about 8 carbon atoms.

When an organofunctional containing organic group ($R^2$) is contained by the organosilane, the particular functional group is selected so that it is compatible with the polymer in which the metal phosphate sols may be incorporated. Specific examples of heterocyclic groups include substituted and unsubstituted pyrroles, pyrazoles, imidazoles, pyrrolidines, pyridines, pyrimidines, oxazoles, thiazoles, furans, thiophenes, dithianes, and isocyanurates. Specific examples of acryloxy groups include acryloxy, alkylacryloxy groups such as methacryloxy, and the like. Specific examples of carbon carbon double bond containing groups include alkenyl, cyclopentadienyl, styryl, and phenyl.

Further examples of organosilanes include phenyltrimethoxysilane; phenyltriethoxysilane; diphenyldimethoxysilane; diphenyldiethoxysilane; 3-aminopropyltrimethoxysilane; 3-aminopropyltriethoxysilane; N-(3-trimethoxysilylpropyl)pyrrole; N-[3-(triethoxysilyl)propyl]-4,5-dihydroimidazole; beta -trimethoxysilylethyl-2-pyridine; N-phenylaminopropyltrimethoxysilane; 3-(N-styrylmethyl-2-aminoethylamino)propyltrimethoxysilane; methacryloxy-propenyltrimethoxysilane; 3-methacryloxypropyltrimethoxysilane; 3-methacryloxypropyltris(methoxyethoxy)silane; 3-cyclopentadienylpropyltriethoxysilane; 7-oct-1-enyltrimethoxysilane, Prosil® 9214 from PCR, Inc. (a carboxy amide silane); 3-glycidoxypropyl-trimethoxysilane; gamma-glycidoxypropylmethyldimethoxysilane; gamma-glycidoxypropylpylpentamethyldisiloxane; gamma-glycidoxypropylmethyldiethoxysilane; gamma-glycidoxypropyldimethylethoxysilane; (gamma-glycidoxypropyl)-bis-(trimethylsiloxy)methylsilane; vinylmethyldiethoxysilane; vinylmethyldimethoxysilane; methylaminopropyltrimethoxysilane; n-octyltriethoxysilane; n-octyltrimethoxysilane; hexyltriethoxysilane; isobutyltrimethoxysilane; 3-ureidopropyltriethoxysilane; 3-isocyanatepropyltriethoxysilane; N-phenyl-3-aminopropyltrimethoxysilane; 3-triethoxysilyl-N-(1,3-dimethyl-butyliden)propylamine; N-2(aminoethyl)-3-aminopropyltriethoxysilane; N-2(aminoethyl)-3-aminopropyltrimethoxysilane; N-2(aminoethyl)-3-aminopropylmethyldimethox 3-acryloxypropyltrimethoxysilane; methacryloxypropylmethyldiethoxysilane; methacryloxypropylmethyldimethoxysilane; glycidoxypropylmethyldiethoxysilane; 2-(3,4 epoxycyclohexyl)-ethyltrimethoxysilane; vinyltrimethoxysilane; vinyltriethoxysilane; amonophenyltrimethoxysilane; triethoxysilane; p-chloromethyl)phenyltri-n-propoxysilane; diphenylsilanediol; 2-(3,4-epoxycyclohexyl) ethyltrimethoxysilane; epoxyhexyltriethoxysilane; tris(3-trimethoxysilylpropyl)isocyanurate; dococentyltrimethoxysilane; 3-mercaptopropyltriethoxysilane; 1,4-bis(trimethoxysilylethyl)benzene; phenylsilane; trimethoxysilyl-1,3-dithiane; n-trimethoxysilylpropylcarbamoylcaprolactam; 2-(diphenylphosphine)ethyltriethoxysilane, 3-cyanopropyltrimethoxysilane, diethylphosphatoethyltriethoxysilane, and the like.

Organosilanes are commercially available from a number of sources including under the trade designation Prosil® from Clariant and from ShinEtsu among others, or they may be prepared from organosilane precursor compounds such as corresponding halosilanes, such as vinyltrichlorosilane.

Boron oxide compounds contain at least boron and oxygen atoms. Boron oxide compounds include boric acid ($B(OH)_3$), alkoxy boron compounds (or boron alkoxides), hydrocarbyl boric acids, hydrocarbyl hydroxy boron alkoxides, and hydroxy boron alkoxides. In one embodiment, boron oxide compounds can be represented by Formula IV:

$$B(OH)_d(OR)_{3-d} \tag{IV}$$

wherein each R is independently a hydrocarbyl group containing from 1 to about 8 carbon atoms, and d is from 0 to about 3. In another embodiment, each R is independently a hydrocarbyl group containing from 1 to about 4 carbon atoms, and d is from 1 to about 2. In yet another embodiment, boron oxide compounds can be represented by Formula V:

$$B(OH)_e(OR)_f(R^3)_{3-(e+f)} \tag{V}$$

wherein each R is independently a hydrocarbyl group containing from 1 to about 8 carbon atoms, each $R^3$ is independently a hydrocarbyl group containing from 1 to about 24 carbon atoms, e is from 0 to about 3, and f is from 0 to about 3. In still yet another embodiment, each R is independently a hydrocarbyl group containing from 1 to about 4 carbon atoms and each $R^3$ is independently a hydrocarbyl group containing from 1 to about 10 carbon atoms.

Specific examples of boron oxide compounds include boric acid, boron tri-n-butoxide, boron tri-sec-butoxide, boron tri-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetylphenylboronic acid, 4-acetylphenylboronic acid, 5-chlorothiophene-2-boronic acid, 1,4-phenylenebis (boronic acid), (2-carboxyphenyl)boronic acid, (3-carboxyphenyl)boronic acid, (4-carboxyphenyl)boronic acid, (3,4-methylenedioxyphenyl)boronic acid, 4-methylthio) phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, (4-methyl-1-naphthalene)boronic acid, and the like.

Boric oxide and boric acids are commercially available. For example, boric acids are available from Aldrich, Acros Organics, and Ryscor Science, Inc. Boron alkoxides and hydroxy boron alkoxides can be synthesized by the dehydration of mixtures of alcohol with boric oxide or boric acid. For example, boric acid and ethanol can be used to synthesize boron triethoxide.

The metal phosphate sols are prepared by combining the metal oxide, the phosphate precursor, and the organosilane in any suitable order with a liquid such as water and/or an organic solvent. In this connection, the metal oxide, the phosphate precursor, and the organosilane may be simultaneously combined; the metal oxide and the phosphate precursor may be initially combined, followed by addition of the organosilane; the metal oxide and the organosilane may be initially combined, followed by addition of the phosphate precursor; or the organosilane and the phosphate precursor may be initially combined, followed by addition of the metal oxide. Optionally, the boron oxide compound may be added to the solution at any time. The presence of boron oxide compound in the reaction solution may allow one to maintain a clear solution throughout the reaction.

The metal oxide, phosphate precursor, organosilane, and optional boron oxide compound are combined in a liquid. The liquid is at least one of water and an organic solvent. In one embodiment, the metal oxide, phosphate precursor, organosilane, and optional boron oxide compound are combined in a mixture of water and at least one organic solvent. In another embodiment, the metal oxide, phosphate precursor, organosilane, and optional boron oxide compound are combined in an organic solvent, followed by addition of water. Irregardless of the liquid protocol, a certain minimum amount of water is desirably provided to facilitate formation of stable sols.

The following general equations illustrate exemplary preparation methods of metal phosphate sols (although it is understood that not every possible permeutation is listed):

$$M+P \; M-P+B \; \text{and/or} \; Si \rightarrow \text{intractable sol (precipitates)} \quad (1)$$

$$M+P+Si \rightarrow \text{mostly tractable sol (with minor insoluble products)} \quad (2)$$

$$M+P+B+Si \rightarrow \text{tractable sol (clear solution)} \quad (3)$$

$$M+P+B \rightarrow [\text{intermediates}]+Si \rightarrow \text{tractable sol (clear solution)} \quad (4)$$

$$M+B \rightarrow [\text{intermediates}]+P \rightarrow [\text{intermediates}]+Si \rightarrow \text{tractable sol} \quad (5)$$

$$P+B \rightarrow [\text{intermediates}]+M \; [\text{intermediates}]+Si \rightarrow \text{tractable sol} \quad (6)$$

wherein M=metal oxide/alkoxide, P=phosphate precursor, B=boric oxide compound, and Si=organosilane.

The effects of boric oxide compound may include one or more of 1) provide more uniform reaction between metal alkoxide (M) and the phosphate precursor (P), thereby allowing to increase higher P/M ratios; and 2) stabilization of the reaction product(s) between metal alkoxide (M) and phosphate precursor (P), thereby allowing lower amounts of Si needed to solubilize in solvents and/or polymers by carrying out multi-step reactions (reaction scheme 4-6 above).

The minimum amount of water, in moles, can be determined based on the empirical equation of the sol formation. More specifically, in one embodiment, representing the reaction as follows:

$$gM_aO_k(OR)_b + lPO(OH)_m(OR)_n(R^4)_{3-(m+n)} + h(R^2)_{4-c}Si(X)_c + iB(OH)_e(OR)_f(R^3)_{3-(e+f)} + jH_2O \Rightarrow \text{metal phosphate sol}$$

where M, R, $R^2$, $R^3$, X, a, b, c, e, k, and f are as defined above, each $R^4$ is independently a hydrocarbyl group containing from 1 to about 12 carbon atoms, m is from 0 to about 3, n is from 0 to about 3, and g, h, i, j, and l are the number of moles of each component. In one embodiment, the minimum amount of water, and thus j, is determined using the following equation: (gb+hc+if+ln)/2. That is, in the above reaction, j ≧(gb+hc+if+ln)/2. In another embodiment, j>(gb+hc+if+ln)/2. This minimum amount of water is referred to as a sol facilitating amount of water. The water may be added when combining the metal oxide, phosphate precursor, organosilane, and optional boron oxide compound with an organic solvent, or when combining the metal oxide, phosphate precursor, organosilane, and optional boron oxide compound with a polymer, or just after combining the metal oxide, phosphate precursor, organosilane, and optional boron oxide compound with a polymer.

In some instances, water for hydrolysis is liberated by the boron compound and/or the phophorus precursor, especially when a boron hydroxide compound and/or a hydroxy phophorus precursor is employed (when e or m in the reaction scheme is at least 1). In these instances, the water created lowers or eliminates the water requirement of jH₂O in the reaction scheme above. Thus, in another embodiment, the minimum amount of water, and thus j, is determined using the following equation: [(gb+hc+if+ln)/2]−(ie+lm). That is, in the above reaction, j ≧[(gb+hc+if+ln)/2]−(ie+lm). A relatively low amount of water, and in some instances no or virtually no water can be employed when a boron hydroxide compound and/or a hydroxy phophorus precursor is employed. The presence of at least one boron hydroxide group can decrease the amount of water needed to promote the sol formation. The boron hydroxide group can provide water by reacting with any number of species including solvents, particularly alcohol solvents, metal oxide groups, and metal hydroxide groups.

For example, in another embodiment, the reaction scheme may be represented by:

$$gM_aO_k(OR)_b + lPO(OH)_m(OR)_n(R^4)_{3-(m+n)} + h(R^2)_{4-c}Si(X)_c + iB(OH)_e(OR)_f(R^3)_{3-(e+f)} \Rightarrow \text{metal phosphate sol}$$

where M, R, $R^2$, $R^3$, $R^4$, X, a, b, c, k, f, m, and n are as defined above, e is at least 1, b is preferably 1, and g, h, i, l, and j are the number of moles of each component.

In yet another embodiment, the reaction scheme may be represented by:

$$gM_aO_k(OR)_b + lPO(OH)_m(OR)_n(R^4)_{3-(m+n)} + h(R^2)_{4-c}Si(X)_c + iB(OH)_e(OR)_f(R^3)_{3-(e+f)} + \text{solvent} \Rightarrow \text{metal phosphate sol}$$

where M, R, $R^2$, $R^3$, $R^4$, X, a, b, c, k, m, n, and f are as defined above, e is at least 1, and g, h, i, l, and j are the number of moles of each component. Preferably, the solvent in this reaction scheme contains at least some alcohol solvent.

Certain relative amounts of the metal oxide, phosphate precursor, organosilane, and optional boron oxide compound are combined in order to facilitate the formation of stable metal phosphate sols.

In one embodiment, from about 10 mole % to about 80 mole % of the metal oxide, 5 mole % to about 70 mole % of the phosphate precursor, and from about 5 mole % to about 80 mole % of the organosilane are combined to form the metal phosphate sols. Optionally, from about 1 mole % to about 80 mole % of the boron oxide compound may be added to the solution. In another embodiment, from about 13 mole % to about 75 mole % of the metal oxide, from 7 mole % to about 65 mole % of the phosphate precursor, and from about 7 mole % to about 75 mole % of the organosilane are combined to form the metal phosphate sols. Optionally, from about 3 mole % to about 75 mole % of the boron oxide compound may be added to the solution. In yet another embodiment, from about 15 mole % to about 70 mole % of the metal oxide, from 10 mole % to about 60 mole % of the phosphate precursor, and from about 10 mole % to about 70 mole % of the organosilane are combined to form the metal phosphate sols. Optionally, from about 5 mole % to about 70 mole % of the boron oxide compound may be added to the solution.

In one embodiment, from about 10% to about 80% by weight of the metal oxide, from about 10% to about 60% by weight of the phosphate precursor, and from about 10% to about 75% by weight of the organosilane are combined to form the metal phosphate sols. Optionally, from about 0.5% to about 40% by weight of the boron oxide compound may be added to the solution. In another embodiment, from about 15% to about 75% by weight of the metal oxide, from about 13% to about 55% by weight of the phosphate precursor, and from about 13% to about 70% by weight of the organosilane are combined to form the metal phosphate sols. Optionally, from about 0.7% to about 35% by weight of the boron oxide compound may be added to the solution. In yet another embodiment, from about 20% to about 70% by weight of the metal oxide, from about 15% to about 50% by weight of the phosphate precursor, and from about 15% to about 65% by weight of the organosilane are combined to form the metal phosphate sols. Optionally, from about 1% to about 30% by weight of the boron oxide compound may be added to the solution.

One or more of any suitable acid catalyst or base catalyst in the amount of about less than about 5% by weight may be optionally employed to facilitate the reaction. Examples of acid catalysts and base catalysts include hydrochloric acid, hydrobromic aicd, ammonium hydroxide, tetraalkylammonium hydroxides, trialkyl amines such as triethyl amine, pyridine, diazabicyclo[2,2,2,]octane, trialkanolamines such as triethanol amine, and alkali metal and alkaline earth metal hydroxides such as sodium hydroxide and potassium hydroxide.

One or more of any suitable organic solvent may be employed to combine the metal oxide, phosphate precursor, organosilane, and optional boron oxide compound. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the subject invention.

The metal oxide, phosphate precursor, organosilane, optional boron oxide compound, and optional acid or base catalyst are combined with water and/or an organic solvent at a temperature suitable to facilitate mixing and/or the formation of the metal phosphate sols. In one embodiment, the temperature while combining components is maintained from about 15° C. to about 100° C. In another embodiment, the temperature while combining components is maintained from about 20° C. to about 90° C.

When a boron oxide compound is added to the solution to prepare the metal phosphate sol, the boron oxide compound can be removed once the metal phosphate sol is prepared. A metal phosphate sol without boron oxide compound also can be used as a host for metal nanoparticles. If desired, the boron oxide can be removed from the metal phosphate sol anytime including before or after making the metal phosphate sol. The boron oxide compound can be removed by various methods. For example, boric acid can be removed by treating the solution with methanol to form volatile methylborate.

The metal phosphate sols may be stored in a wet or dry state. In the wet state, the metal oxide, phosphate precursor, organosilane, optional boron oxide compound, and organic solvent and/or water are simply stored in a container. When storage in a wet state is employed, delivery and movement of the metal phosphate sols is facilitated by minimizing the amount of liquid. In one embodiment, the metal phosphate sols may be stored in a wet state for at least about 6 months. In another embodiment, the metal phosphate sols may be stored in a wet state for at least about 9 months.

When storing in a dry state, the metal phosphate sols in the wet state are subject to an evaporation technique, with optional heating, to remove the liquids present. A vacuum may be employed. The resultant dry metal phosphate sols are in a powder-like form. In one embodiment, the metal phosphate sols may be stored in a dry state for at least about 6 months. In another embodiment, the metal phosphate sols may be stored in a dry state for at least about 9 months.

In one embodiment, the dried metal phosphate sols contain from about 10% to about 80% by weight of the metal oxide, from about 10% to about 60% by weight of the phosphate precursor, and from about 10% to about 75% by weight of the organosilane. Optionally, the dried metal phosphate sols also contain from about 0.5% to about 40% by weight of the boron oxide compound. In another embodiment, the dried metal sols contain from about 15% to about 75% by weight of the metal oxide, from about 13% to about 55% by weight of the phosphate precursor, and from about 13% to about 70% by weight of the organosilane. Optionally, the dried metal phosphate sols also contain from about 0.7% to about 35% by weight of the boron oxide compound. In yet another embodiment, the dried metal sols contain from about 20% to about 70% by weight of the metal oxide, from about 15% to about 50% by weight of the phosphate precursor, and from about 15% to about 65% by weight of the organosilane. Optionally, the dried metal phosphate sols also contain from about 1% to about 30% by weight of the boron oxide compound.

In one embodiment, the dried metal sols contain less than about 0.5% by weight water. In another embodiment, the dried metal sols contain less than about 0.1% by weight water. In yet another embodiment, the dried metal sols contain less than about 0.05% by weight water.

When storing in a dry state, the dried sols can be heated up to about 200° C. for about 2 hours without degradation. Also when storing in a dry state, the dried sols can be stored in at least a semi-airtight container, although this is not necessary. Due to the stability of the metal phosphate sols, an advantage is that they may be stored in the open air without degradation. This is because it is believed that the metal phosphate sols resist water uptake and/or are stable to oxidation. It is another alternative to store the dried sols in an airtight container or in a vacuum pack/state.

At least one of guest metal nanoparticle and guest metal-chalcogenide nanoparticle is combined with the metal phosphate sols, or combined with one or more of the metal oxide, phosphate precursor, organosilane, optional boron oxide compounds, catalyst, water and/or an organic solvent during formation of the metal phosphate sols in any suitable order to provide the nanocomposites containing the host metal phosphate sols and guest metal nanoparticles and/or guest metal-chalcogenide nanoparticles.

For example, the guest metal nanoparticles and/or the guest metal-chalcogenide nanoparticles may be simultaneously combined with the metal oxide, the phosphate precursor, and the organosilane (combine all four components, then hydrolyze); the metal oxide, the phosphate precursor, and the liquid are initially combined, followed by adding the guest metal nanoparticles and/or the guest metal-chalcogenide nanoparticles, and further followed by adding the organosilane; the metal oxide, the phosphate precursor, the organosilane, and the liquid are initially combined, followed by adding the guest metal nanoparticles and/or the guest metal-chalcogenide nanoparticles; the metal oxide, the guest metal nanoparticles and/or the guest metal-chalcogenide nanoparticles, and the liquid are initially combined, followed by adding the phosphate precursor; the metal oxide, the guest metal nanoparticles and/or the guest metal-chalcogenide nanoparticles are initially combined, followed by adding organosilane, and further followed by adding the phosphate precursor. Optionally, the boron oxide compound may be added to the solution at any time. The presence of a boron oxide compound and/or an acid or base catalyst in the reaction solution may allow one to maintain a clear solution throughout the reaction.

The use of chelating compounds can effectively help control the particle size of guest metal nanoparticles and/or the guest metal-chalcogenide nanoparticles. Chelating compounds include silanes having a chelating group such as mercapto, amino, cyano, amide, phosphino, or heterocyclic group and non-silane chelating compounds such as alkylthiols, arylthiols, alkylamines, arylamines, alkylcarboxylic acids, arylcarboxylic acids, arylphosphines, alkylphosphines, and the like. Chelating compounds can be added during the preparation of host metal phosphate sols or host-guest metal phosphate sols.

Generally speaking, the metal nanoparticles precursors fall into two groups; namely, 1) noble metal ions and 2) zero valence noble and non-noble metals. Although more fully described elsewhere, examples of noble metal ions include gold hydroxide and silver acetate. Noble metal ions can be reduced to form metal nanoaprticles by heat, UV exposure, and reducing agents (such as phenylsilane, hydrogen gas, etc.). Examples of zero valence noble and non-noble metals include metal carbonyls and metal olefins. Zero valence noble and non-noble metals can release ligands and form metal clusters/nanoparticles by application of heat, for example. Specific examples of non-noble metal ions include cadmium acetate and lead acetate. Non-noble metal ions can form metal chalcogenide nanoparticles after incorporation into a host sol and treated with a chalcogenizing agent.

While metal nanoparticles precursors are converted to metal nanoaprticles, which are then converted to metal chalcogenide nanoaprticles (generally when the metal nanoparticles precursors are noble metal ions); metal nanoparticles precursors may be directly converted to metal chalcogenide nanoaprticles (generally when the metal nanoparticles precursors are zero valence noble and non-noble metals).

Generally speaking, high level examples of making the metal chalcogenide nanoaprticles include one or more of the following three general and specific reaction routes.

$(CO)_{12}$, $Mo(CO)_6$, $Ni(CO)_4$, $Os(CO)_5$, $Os_3(CO)_{12}$, $Ir_4(CO)_{12}$, $W(CO)_6$, $Tc_2(CO)_{10}$, $Ru(CO)_5$, $Rh(CO)_{12}$, $Pd(CO)_4$, $Pt(CO)_4$, platinum-1,3-divinyl-1,1,3,3,-tetramethyldisiloxane, and the like.

Examples for metal chalcogenide precursors or guest metal precursors include, in addition to the metal nanoparticles precursors listed above, iron hydroxide, cobalt hydroxide, zinc hydroxide, nickel hydroxide, cadmium hydroxide, iron acetate, cobalt acetate, zinc acetate, chromium acetate hydroxide, manganese acetate, molybdenum acetate, nickel acetate, lead acetate, cadmium acetate, iron chloride, cobalt chloride, zinc chloride, vanadium chloride, chromium chloride, manganese chloride, molybdenum chloride, nickel chloride, lead chloride, cadmium chloride, niobium chloride, tungsten chloride, iron acetylacetonate, cobalt acetylacetonate, zinc acetylacetonate, vanadyl acetylacetonate, chromium acetylacetonate, manganese acetylacetonate, molybdenum acetylacetonate, nickel acetylacetonate, lead acetylacetonate, cadmium acetylacetonate, niobium acetylacetonate, iron citrate, cobalt citrate, zinc citrate, nickel citrate, lead citrate, iron nitrate, cobalt nitrate, zinc nitrate, chromium nitrate, manganese nitrate, nickel nitrate, lead nitrate, cadmium nitrate, iron ethoxide, cobalt ethoxide, zinc ethoxide, vanadium ethoxide, chromium ethoxide, manganese ethoxide, molybdenum ethoxide, nickel ethoxide, lead ethoxide, cadmium ethoxide, niobium ethoxide, tungsten ethoxide, cerium methoxyethoxide, erbium acetate, europium acetoacetate, gallium ethoxide, hafnium n-butoxide, indium methoxyethoxide, mercury acetate, strontium acetate, tantalum n-butoxide, yttrium acetate, and tin acetoacetate.

Metal-chalcogenide nanoparticles may noble or non-noble metal-chalcogenide nanoparticles. Examples of metal-chalcogenide nanoparticles may contain AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe,

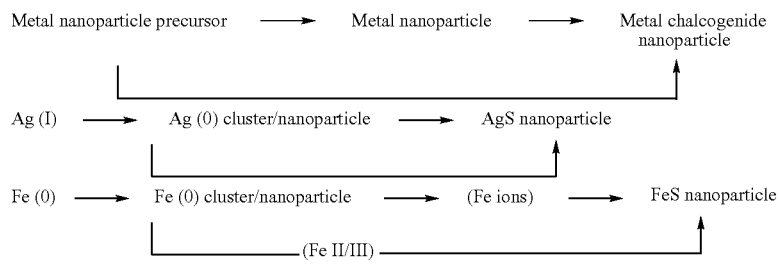

Guest metal nanoparticles may include zero valence metal (e.g., metal carbonyls, metal olefins) and metal ions (e.g., metal oxides, metal hydroxides, metal carboxylates, metal nitrates, metal halides, metal cyanides, chelated metals), such as a guest metal precursor. Examples of metals include gold, silver, platinum, palladium, ruthenium, copper, rhodium, technetium, osmium, iron, cobalt, zinc, vanadium, chromium, manganese, rhenium, nickel, iridium, and tungsten. Examples of guest metal precursors or metal nanoparticles precursors include gold hydroxide, gold acetate, gold chloride, silver acetate, silver acetylacetonate, silver citrate, silver lactate, silver nitrate, platinum acetylacetonate, platinum chloride, palladium acetylacetonate, palladium acetate, palladium hydroxide, ruthenium acetylacetonate, copper acetate, copper ethoxide, $Fe(CO)_5$, $Fe_2(CO)_9$, $Co_2(CO)_8$, $ZnX(CO)Y$, $V(CO)_6$, $Cr(CO)_6$, $Mn_2(CO)_{10}$, $Re_2(CO)_{10}$, $Ru_3$ FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

In one embodiment, from about 20% to about 99.99% by weight of the metal phosphate sols and from about 0.01% to about 80% by weight of the guest metal nanoparticles and/or the guest metal-chalcogenide nanoparticles are combined to form the host-guest metal phosphate sols. In another embodiment, from about 50% to about 99.95% by weight of the metal phosphate sols and from about 0.05% to about 50% by weight of the guest metal nanoparticles and/or the guest metal-chalcogenide nanoparticles are combined to form the host-guest metal phosphate sols. In yet another embodiment, from about 80% to about 99.9% by weight of the metal phosphate sols and from about 0.1% to about 20% by weight of the guest metal nanoparticles and/or the guest metal-chalcogenide nanoparticles are combined to form the host-guest metal phosphate sols.

The nanocomposites containing the host metal phosphate sols and guest metal-chalcogenide nanoparticles can be prepared by chalcogenizing the nanocomposites containing the host metal phosphate sols and guest metal nanoparticles. The guest metal nanoparticles in the host-guest metal phosphate sols may be chalcogenized to provide the nanocomposites containing the host metal phosphate sols and guest metal-chalcogenide nanoparticles.

The host-guest metal phosphate sols may be treated with a chalcogenizing agent at ambient temperature or at elevated temperatures to provide the metal-chalcogenide nanocomposites. Chalcogenizing agents include sulfurization agents, selenization agents and tellurization agents. Hydrogen chalcogenides such as $H_2S$, $H_2Se$, and $H_2Te$ may be used. In addition, other chalcogenizing agents may be used which include labile metal-chalcogenides, elemental chalcogens, thioamide (e.g., methylthioamide), thioacetamide (e.g., methoxythioacetamide), thiourea, bis-(trimethylsilylsulfide), carbon disulfide, and the like. Labile metal-chalcogenides include $Al_2S_3$, $Al_2Se_3$, $Al_2Te_3$, $Na_2S$, $Na_2Se$, $Na_2Te$, CaS, CaSe, CaTe, FeS, FeSe, FeTe, $TiS_2$, $TiSe_2$, $TiTe_2$, $ZrS_2$, $ZrSe_2$, $ZrTe_2$, $B_2S_3$, $B_2Se_3$, and $B_2Te_3$. Elemental chalcogens include S, Se, and Te.

The chalcogenization treatment may be carried out either in solution form or in powder form of host-guest metal phosphate sols. In one embodiment, the host-guest metal phosphate sols in a wet state may be subject to chalcogenization treatment. The host-guest metal phosphate sols may be dissolved in a liquid. The liquid may be water and/or an organic solvent. In one embodiment, the host-guest metal phosphate sols are dissolved in an organic solvent. In another embodiment, the host-guest metal phosphate sols are dissolved in a mixture of water and at least one organic solvent. In another embodiment, the host-guest metal phosphate sols are dissolved in water, followed by addition of an organic solvent. In yet another embodiment, the host-guest metal phosphate sols are dissolved in an organic solvent, followed by addition of water.

One or more of any suitable organic solvent may be employed to dissolve the host-guest metal phosphate sols. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like. The identity of the organic solvent is not critical to the subject invention.

The host-guest metal phosphate sols may be dissolved in water and/or an organic solvent at a temperature suitable to facilitate dissolving. In one embodiment, the temperature while dissolving the host-guest metal phosphate sols is maintained from about 20° C. to about 100° C. In another embodiment, the temperature while dissolving the host-guest metal phosphate sols is maintained from about 30° C. to about 90° C.

The host-guest metal phosphate sols solution may be treated with a chalcogenizing agent. In one embodiment, chalcogenizing agent gas may be bubbled through the solutions. In another embodiment, the host-guest metal phosphate sols solution may be combined with chalcogenizing agent solution.

The chalcogenization treatment may be carried out in powder form of host-guest metal phosphate sol. The host-guest metal phosphate sols powder may be exposed to a chalcogenizing agent. In one embodiment, the host-guest metal phosphate sol powder may be exposed to a chalcogenizing agent gas.

The chalcogenization treatment may be carried out at a temperature suitable to facilitate chalcogenization. In one embodiment, the chalcogenization treatment is carried out at an ambient temperature. In another embodiment, the temperature during chalcogenization is maintained from about 10° C. to about 100° C. In another embodiment, the temperature during chalcogenization is maintained from about 15° C. to about 90° C.

When a boron oxide compound is added to prepare the metal phosphate sol, the boron oxide compound can be removed once the metal phosphate sol is prepared. A metal phosphate sol without boron oxide compound also can be used as a host for metal nanoparticles. If desired, the boron oxide can be removed from a metal phosphate sol anytime including before or after making a host-guest metal phosphate sol and after chacogenizing the guest metal nanoparticles.

The nanocomposites containing the host metal phosphate sols and guest metal nanoparticles and/or guest metal-chalcogenide nanoparticles may be stored in a wet or dry state. In the wet state, the metal oxide, phosphate precursor, organosilane, optional boron oxide compounds, guest metal nanoparticles and/or guest metal-chalcogenide nanoparticles, and organic solvent and/or water are simply stored in a container. When storage in a wet state is employed, delivery and movement of the nanocomposites is facilitated by minimizing the amount of liquid. In one embodiment, the nanocomposites may be stored in a wet state for at least about 6 months. In another embodiment, the nanocomposites may be stored in a wet state for at least about 9 months. When stored in a wet state, flocculation is mitigated and/or eliminated. When stored in a wet or dry state, color changes are mitigated and/or eliminated.

When storing in a dry state, the nanocomposites in the wet state are subject to an evaporation technique, with optional heating, to remove the liquids present. A vacuum may be employed. The resultant dry nanocomposites are generally in a powder-like form. In one embodiment, the nanocomposites may be stored in a dry state for at least about 6 months. In another embodiment, the nanocomposites may be stored in a dry state for at least about 9 months.

In one embodiment, the dried nanocomposites contain less than about 0.5% by weight of water. In another embodiment, the dried nanocomposites contain less than about 0.1% by weight of water. In yet another embodiment, the dried nanocomposites contain less than about 0.05% by weight of water.

When storing in a dry state, the nanocomposites can be heated up to about 200° C. for about 2 hours without degradation. Also when storing in a dry state, the dried nanocomposites can be stored in at least a semi-airtight container, although this is not necessary. Due to the stability of the nanocomposites, an advantage is that they may be stored in the open air without degradation. This is because it is believed that nanocomposites resist water uptake and/or are stable to oxidation. It is another alternative to store the dried nanocomposites in an airtight container or in a vacuum pack/state.

A dielectric composite contains at least a dielectric material and the metal phosphate sols and/or the metal nanocomposites containing metal nanoparticles and/or metal-chalcogenide nanoparticles. The dielectric composite may further contain optional additives such as, for example, coupling agents (silane, titanium, or zirconium coupling agents), surfactants, catalysts, and fillers. Additives can enhance sol-dielectric compatibility and/or nanocomposite-dielectric compatibility. The metal phosphate sols and/or the metal nanocomposites are incorporated into the dielectric matrix on a nanoscale basis in a substantially uniform manner. That is, the metal phosphate sols and/or the nanocomposites are uniformly dispersed throughout the dielectric material. Generally speaking, dielectric materials include glasses, ceramics, polymers, and the like. Generally speaking, polymers include thermosets, thermoplastics, synthetic rubbers, extrudable polymers, injection molding polymers, moldable polymers, and the like.

The nanocomposites containing metal nanoparticles and/or metal-chalcogenide nanoparticles have a small size permitting uniform incorporation into a dielectric material. Since the nanocomposites can disperse within a medium such as a liquid or dielectric material without aggregation, the small size is retained after incorporation.

The small size of the nanocomposites is controllable. In one embodiment, at least 50% by weight of the nanocomposites have a particle size from about 1 nm to about 250 nm, or a particle size of about 250 nm or less. In another embodiment, at least 50% by weight of the nanocomposites have a particle size from about 2.5 nm to about 100 nm, or a particle size of about 100 nm or less. In another embodiment, at least 50% by weight of the nanocomposites have a particle size from about 5 nm to about 50 nm, or a particle size of about 50 nm or less.

The controllable particle size is particularly advantageous because the presence of the nanocomposites in a medium such as dielectric material may induce color shifts. For example, generally smaller sized CdS nanoparticles of the nanocomposites generate a blue color shift, while generally larger sized CdS nanoparticles of the nanocomposites generate a red color shift. The ability to generate color shifts makes the nanocomposites suitable for use in various optical applications.

The nanocomposites may be incorporated into a dielectric material to form a dielectric composite, or they may be used in applications where the metal nanoparticles can be used, such as in sensor devices, catalysts, photonics devices, high density magnetic recording components, recording media, other magnetic applications, color filters, dyes, optical filters, hair coloring products, solar energy conversion, flame retardant, corrosion protection coating, battery, photocatalysis, electronics, nonlinear optics, electroluminescent displays, photoluminescent sensors, nanoelectronic devices, biological probes, light-emitting quantum dots, quantum dot lasers, and the like.

In one embodiment, dielectric composites of the subject invention contain from about 1% by weight to about 99.99% by weight of the dielectric material and from about 0.01% by weight to about 99% by weight of the metal phosphate sols and/or the nanocomposite containing the metal nanoparticles and/or metal-chalcogenide nanoparticles. In another embodiment, the dielectric composite contains a major amount of the dielectric material and a minor amount of the metal phosphate sols and/or the metal nanocomposite, and optionally a minor amount of additives. In another embodiment, dielectric composites of the subject invention contain from about 20% by weight to about 99.9% by weight of the dielectric material and from about 0.1% by weight to about 80% by weight of the metal phosphate sols and/or the nanocomposite containing the metal nanoparticles and/or metal-chalcogenide nanoparticles. In yet another embodiment, dielectric composites of the subject invention contain from about 70% by weight to about 99% by weight of the dielectric material and from about 1% by weight to about 30% by weight of the metal phosphate sols and/or the metal nanocomposite containing the metal nanoparticles and/or metal-chalcogenide nanoparticles. The dielectric composite is made by combining suitable amounts of the dielectric material and the metal phosphate sols and/or the metal nanocomposite.

The polymer is any suitable material capable of forming a pre-polymer material, a partially polymerized material or a polymer, that incorporate the metal phosphate sols and/or the nanocomposites. The polymer may be polymer monomers, a B-staged polymer, or a polymer. In one embodiment, the polymer is at least one of a polyacrylate such as polymethylmethacrylate, an unsaturated polyester, a saturated polyester, a polyolefin (polyethylenes, polypropylenes, polybutylenes, and the like), an alkyd resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, copolymers of two or more thereof, and the like.

Suitable polymers include acrylic resins. Examples of acrylic monomers include monoacrylics, diacrylics, triacrylics, tetraacrylics, pentacrylics, etc. Examples of polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethyl methacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly (propylene glycol)methacrylate.

Examples of suitable diacrylates which can be used to form polyacrylates include 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di-trimethylopropane tetraacrylate, and ethoxylated pentaerythritol tetraacrylate. Examples of pentaacrylates include dipentaerythritol pentaacrylate and pentaacrylate ester.

Polyacrylates include other aliphatically unsaturated organic compounds, such as polyacrylamides and unsaturated polyesters, which are condensation products of unsaturated dicarboxylic acids and diols, and vinyl compounds, or compounds having a terminal double bond. In one embodiment, these materials are co-cured with the acrylic component by free radical technique. Examples of vinyl compounds include N-vinylpyrrollidone, styrene, vinyl naphthalene and vinylphtalimide. Polyacrylamides (including poly(meth) acrylamide derivatives) are commercially available. Some of the particular (meth)acrylamide derivatives useful in the subject invention include N-alkyl- or N-alkylene-substituted or unsubstituted (meth)acrylamides. Specific examples thereof are acrylamide, methacrylamide, N-methacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n-propylmethacrylamide, N-acryloyloylpyrrolidine, N-methacryloylpyrrolidine, N-acryloylpiperidine, N-methacryloylpiperidine, N-acryloylhexahydroazepine, N-acryloylmorpholine and N-mathacryloylmorpholine.

Other suitable polymers include unsaturated and saturated polyesters including alkyd resins. The polyesters may be condensation polymers derived by the condensation of polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are or are not subject to cross-linking.

The unsaturated polyesters are prepared by reacting the one or more unsaturated polybasic acids or anhydrides with the polyols (di- or tri-hydroxy compounds) in approximately equal proportions. Examples of such polyesters include polyesters prepared from: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). A wide variety of polyester resins that can be used are commercially available.

Suitable polymers include epoxy resins. Epoxy resins include resins comprised of monomers, oligomers, and polymers containing one or more oxirane rings. A wide variety of such resins are available commercially. Such resins have either a mixed aliphatic-aromatic or an exclusively non-benzeneoid (i.e., aliphatic or cycloaliphatic) molecular structure. Representative examples of acceptable substituent groups include halogens, ester groups, ether groups, sulfonate groups, siloxane groups, nitro groups, and phosphate groups.

Epoxy resins are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350-400 and an epoxide equivalent of about 175-210. Epoxy resins such as Araldite 6010, manufactured by Ciba-Geigy can also be utilized. These epoxy resins are of the glycidyl-type epoxide, and are preferably diglycidyl ethers of bis-phenol A which are derived from bisphenol and epichlorohydrin.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent. Another group of epoxy resins are available from Furane Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." and "D.E.W." resins obtainable from Dow Chemical Company and "Epotuf" liquid epoxy resins obtainable from Reichhold Chemicals Inc. are examples of such resins preferred for employment in accordance with the invention. An example is an "Epotuf" liquid epoxy resin in the undiluted medium high viscosity #37-140 having an epoxide equivalent weight of 180-195, a viscosity (ASTM D445) of 11,000-14,000 cps at 25° C., and a Gardner Color Maximum of 3.

In some embodiments of the subject invention the epoxy resins may be "solubilized" by neutralization with a basic compound such as an organic amine. Examples of amines include amines and hydroxyamines including diethylamine, triethylamine, triethanolamine, dimethylethanolamine, etc. Epoxy resins also include polyamide modified epoxy resins, such as AF-42 from Minnesota Mining and Manufacturing Co.

Additional examples of the epoxy resins derived from amines include tetraglycidyldiaminodiphenylmethane, triglycidyl-p-aminophenol, triglycidyl-m-aminophenol and triglycidylaminocresol and their isomers, examples of the epoxy resins derived from phenols include bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the subject invention is not restricted to the use of these compounds. Furthermore, mixtures of two or more of the epoxy resins can be used and monoepoxy compounds can also be incorporated.

Generally, epoxy resins for use in the invention are compositions containing glycidyl ether monomers. Representative examples of these are the glycidyl ethers of polyhydric phenols obtained by reacting a polyhydric phenol with an excess of chlorohydric, such as epichlorohydrin. Specific examples of epoxy resins include 2,2-bis[4-(2,3-epoxypropoxy)phenyl]propane(diglycidyl ether of bisphenol A) and commercially available materials under the trade designation "Epon 828F", "Epon 1004F" and "Epon 1001F" available from Shell Chemical Co., "DER-331", DER-332" and "DER-334" available from the Dow Chemical Co. Preferred is the diglycidyl ether of bisphenol A, "CMD 35201" available from Rhone Poulenc, Inc., Louisville, Ky. Other suitable epoxy resins include glycidyl ethers of phenol formaldehyde novolak resins (e.g., "DEN-431" and "DEN-438" available from the Dow Chemical Co.), and resorcinol digylcidyl ether. Additional examples of epoxides are described in U.S. Pat. No. 3,018,262, incorporated herein by reference.

Epoxy resins further include UV curable epoxies and cycloaliphatic epoxy resins. UV curable epoxies and cycloaliphatic epoxy resins are available under the trade designation Cyracure® specificaly including products 6100, 6105, 6110, and 6351 from Union Carbide/Dow Chemical.

Suitable polymers include polyamides. In particular, the polymers may be aliphatic or aromatic polyamides. Polyamides are commercially available. Examples of polyamides include those under the trade designations Zytel available from DuPont, Capron from AlliedSignal, Texapol from Hanna, Ashlene from Ashley, Ultramid from BASF, Durethan from Bayer, Grilamid from EMS, Vestamid from Huls America, Vydyne from Monsanto, Wellamid from Wellman and others.

Specific examples of polyamides include nylon 6 (polycaprolactam), nylon 6/6 (polyhexamethyleneadipamide), nylon 6/10 (condensation product of hexamethylenediamine and sebacic acid), nylon 6/12, nylon 6/T (polyhexamethylene terephthalamide), nylon 7 (polyenanthamide), nylon 8 (polycapryllactam), nylon 9 (polypelargonamide), nylon 10, nylon 11, nylon 12, nylon 55, nylon XD6 (poly metha-xylylene adipamide), nylon 6/1, poly-alanine, NOMAX® 410 available from DuPont, polyamides under the trade designations PA 7030 and 5050 available from Dow, and Ultramid K1297/2 available from BASF.

Suitable polymers include polyimides. Polyimides can be prepared by reacting a diisocyanate with a dianhydride, or a dianhydride with an aromatic diamine (such as 3,3',4,4'-benzophenonetetracarboxylic dianhydride-co-4,4'-oxydianiline and methylenedianiline). Examples of polyimides include KAPTON and VESPEL available from DuPont.

Suitable polymers include polyetherimides. Polyetherimides are polymers containing ether and imide linkages. For example, polyetherimides can be prepared by reacting at least one diamine, such as m-phenylenediamine or p-phenylenediamine, with at least one ether dianhydride, such as 2,2-bis [(3,4-dicarboxyphenoxy)phenyl]propane dianhydride. Polyetherimides are commercially available. Examples of polyetherimides include those under the trade designation ULTEM-1000, ULTEM-4000 and ULTEM-6000 from General Electric, RTP 2101, 2103 and 2105 from RTP and Thermofil W-1 OFG0100, W-20FG0100 and W-30FG0100 from Thermofil. Polyetherimides also include silicone polyetherimides.

Suitable polymers also include polyamideimides. Polyamideimides may be prepared by condensing an imide and an amide. Polyamideimides are commercially available. Examples of polyamideimides include those under the trade designation TORLON™ available from Amoco and Lack E 3560/32 and 3561/27 available from Herberts Gmbh.

Suitable polymers include polyesterimides. Polyesterimdes are commercially available. Examples of polyesteramides include TERBEC® 533 L-33 available from BASF, IMIDEX-E available from General Electric and those made according to U.S. Pat. Nos. 3,426,098 and 3,697,471 which are herein incorporated by reference.

Suitable polymers include polyesteramideimides. Polyesteramideimides are commercially available. Examples of polyesteramideimides include copolymers of any combination of a polyester, a polyamide and polyimide.

In one embodiment, polymer composites of the subject invention contain from about 1% by weight to about 99.99% by weight of the polymer and from about 0.01% by weight to about 99% by weight of the metal phosphate sols and/or the nanocomposites containing the metal nanoparticles and/or metal-chalcogenide nanoparticles. In another embodiment, the polymer composite contains a major amount of the polymer and a minor amount of the metal phosphate sols and/or the nanocomposites, and optionally a minor amount of additives such as coupling agents. A major amount means at least 50% by weight or more, while a minor amount means less than 50% by weight. In another embodiment, polymer composites of the subject invention contain from about 20% by weight to about 99.9% by weight of the polymer and from about 0.1% by weight to about 80% by weight of the metal phosphate sols and/or the nanocomposites containing the metal nanoparticles and/or metal-chalcogenide nanoparticles. In yet another embodiment, polymer composites of the subject invention contain from about 70% by weight to about 99% by weight of the polymer and from about 1% by weight to about 30% by weight of the metal phosphate sols and/or the nanocomposites containing the metal nanoparticles and/or metal-chalcogenide nanoparticles.

The polymer composite is made by combining suitable amounts of the polymer and the metal phosphate sols and/or the nanocomposites containing the metal nanoparticles and/or metal-chalcogenide nanoparticles. If the metal phosphate sols and/or the nanocomposite are stored in a dry state, it can be combined with an organic solvent and/or water before combined with the polymer. The polymer is preferably in a liquid or semi-liquid state. The polymer and the metal phosphate sols and/or the metal nanocomposite are mixed to facilitate uniform distribution of the metal phosphate sols and/or the metal nanocomposite within the polymer. In one specific embodiment, the metal phosphate sols powder and/or the nanocomposite powder (stored in a dry state) is combined with a polymer or prepolymer powder, and the mixture is then melted and molded or extruded.

After combining and mixing suitable amounts of the polymer and the metal phosphate sols and/or the nanocomposites containing the metal nanoparticles and/or metal-chalcogenide nanoparticles, the mixture is then cured, molded, extruded, formed, or subjected to suitable polymer processing to form a polymer composite having the metal phosphate sols and/or the nanocomposites substantially uniformly dispersed therein. In the case of a translucent polymer, for example a polyacrylate, the resultant polymer composite is also translucent, indicating that the metal phosphate sols and/ or the nanocomposite are dispersed on a nanoscale. Polymer composites are generally smooth, further indicating that the metal phosphate sols and/or the nanocomposites are dispersed on a nanoscale.

The subject invention further provides methods of improving certain properties in dielectric compositions, such as one or more of methods of improving strength, methods of improving corona resistance, methods of improving plasma resistance, methods of improving resistance to organic solvents, methods of improving high temperature stability, methods of improving flame retardancy, methods of improving oxidative stability, methods of modifying refractive index, methods of improving fracture properties, methods of improving abrasion resistance, methods of improving liquid permeability, methods of improving gas permeability including methods of improving gas permeability to specific gases, methods of improving (low) hysteresis loss (low rolling resistance), methods of improving corrosion protection, and methods of improving field responsive capability. The methods of improving certain properties in dielectric compositions are accomplished by incorporating the metal phosphate sols and/or the nanocomposites into dielectric materials such as a polymer system.

The following examples illustrate the subject invention. Unless otherwise indicated in the following examples and elsewhere in the specification and claims, all parts and percentages are by weight, all temperatures are in degrees Centigrade, RT is room temperature, and pressure is at or near atmospheric pressure.

COMPARATIVE EXAMPLE 1

Comparative Example 1 involves the preparation of aluminum phosphate without using an organosilane. A homogeneous solution of aluminum s-butoxide (0.082 gm, 0.33 mmol) in methoxyethanol (0.5 ml) is prepared in a glass vial containing a magnetic stir bar. It is stirred for ½ hr after addition of ethylphosphate (0.06 gm, 0.33 mmol). Addition of DI water (0.010 gm, 0.56 mmol) results in the formation of a milky gel. After diluting with 0.5 ml methoxyethanol, the resulting milky solution is stirred at room temperature/overnight. Addition of DI water (0.010 gm, 0.56 mmol) followed by stirring at RT/overnight and 100° C./2 hrs generates white precipitates. The solution is applied to a glass plate to form a highly opaque non-uniform coating. White solid residues obtained after removing the volatiles are not soluble in methoxyethanol even heated to 120° C. in the presence of phenyltrimethoxysilane.

EXAMPLE 1

Example 1 describes the preparation of aluminum phosphate sol. A homogeneous solution of aluminum s-butoxide (0.165 gm, 0.67 mmol), phenyltrimethoxysilane (0.133 gm, 0.67 mmol), ethylphosphate (0.12 gm, 0.67 mmol), and methoxyethanol (0.5 gm) is prepared in a vial containing a magnetic stir bar. A solution of boric acid (0.042 gm, 0.68 mmol) in methoxyethanol (0.28 gm) is added. DI water (0.036 gm, 2 mmol) is added after stirring for ½ hr. The resulting clear solution is then stirred at RT/overnight and 120° C./4 hrs. After removing the volatiles in vacuo, the residues are further heated in an oven at 130° C./2 hrs to give colorless powders (0.19 gm). The dried sol powder (0.026 gm) is dissolved in methoxyethanol (0.5 ml) by heating to 100° C. to obtain a clear solution. It is cast on a glass plate under $N_2$ to give a clear thin film that shows no cracks even after heating to 300° C. The dried sol powder (0.025 gm) stored in a glass vial at RT over 9 months and heat-treated in an oven at 200° C./1 hr exhibits good solubility in methoxyethanol (0.5 gm) to provide a clear solution.

EXAMPLE 2

Example 2 describes the preparation of aluminum phosphate sol. A homogeneous solution of aluminum s-butoxide (0.165 gm, 0.67 mmol), phenyltrimethoxysilane (0.133 gm, 0.67 mmol), ethylphosphate (0.12 gm, 0.67 mmol), and methoxyethanol (0.5 gm) is prepared in a vial. DI water (0.03 gm, 1.7 mmol) is added and the solution is stirred at RT/overnight and 80° C./2 hrs. Additional DI water (0.04 gm, 2.2 mmol) is added and the process is repeated. Finally, the solution is heated at 120° C./2 hrs. The volatiles are removed in vacuo and the residues are heated in an oven at 130° C./2 hrs to give colorless powders (0.17 gm). The dried sol (0.025 gm) is mixed with methoxyethanol (0.5 ml) and phenyltrimethoxysilane (0.007 gm) at 100° C./3 hrs to give a clear solution. It is cast on a glass plate to form a clear thin film that shows no cracks even after heating to 300° C.

EXAMPLE 3

Example 3 describes the preparation of aluminum phosphate sol. To a solution of aluminum s-butoxide (0.123 gm, 0.5 mmol) in methoxyethanol (0.5 ml) was added ethylphosphate (0.092 gm, 0.51 mmol) and the solution is stirred for 1 hr. A solution of boric acid (0.031 gm, 0.5 mmol) in methoxyethanol (0.2 ml) is added and the resulting solution is stirred at RT/overnight and 80° C./2 hrs to obtain a clear viscous solution. The solution is further stirred at 80° C./2 hrs after addition of phenyltrimethoxysilane (0.076 gm, 0.38 mmol). DI water (0.020 gm, 1.1 mmol) is added and stirring continued at 120° C./3 hrs. The solution remains clear throughout the process. Removal of the volatiles in vacuo followed by heat-treatment at 130° C./3 hrs gives colorless powders (0.129 gm). The dried sol (0.01 gm) is dissolved in methoxyethanol (0.5 ml) and cast on a glass plate under $N_2$ to form a clear thin film that exhibits no cracks even after heating to 300° C.

EXAMPLE 4

Example 4 describes the preparation of aluminum phosphate sol by the use of octyltriethoxysilane. To a solution of aluminum s-butoxide (0.165 gm, 0.67 mmol) in metoxyethanol (0.5 ml) are added ethylphosphate (0.125 gm, 0.69 mmol) and boric acid (0.043 gm, 0.67 mmol) predissolved in methoxyethanol (0.3 ml). After stirring at RT/overnight, octyltriethoxysilane (0.11 gm, 0.4 mmol) is added and the solution is heated to 100° C./5 hrs. Addition of DI water (0.015 gm, 0.83 mmol) followed by stirring at RT/overnight and 120° C./4 hrs gives a clear solution that forms white precipitates upon cooling to RT. Removal of the volatiles in vacuo followed by heat-treatment in an oven at 160° C./3 hrs yields white powders (0.166 gm). A clear sol solution prepared by admixing the sol powder (0.024 gm), xylene (0.5 ml), and methoxyethanol (0.05 ml) generates a crack-free thin clear film on a glass plate when cast under $N_2$ and heated to 150° C.

EXAMPLE 5

Example 5 describes the preparation of titanium phosphate sol. A homogeneous solution of titanium propoxide (0.108 gm, 0.38 mmol), phenyltrimethocxysilane (0.099 gm, 0.5 mmol), and ethylphosphate (0.138 gm, 0.76 mmol) in methoxyethanol (0.5 ml) is prepared in a vial. After addition of a solution of boric acid (0.031 gm, 0.5 mmol) in methoxyethanol (0.2 ml), the resulting solution is stirred at RT/overnight and 100° C./2 hrs. DI water (0.05 gm, 2.8 mmol) is added and stirring is continued at 100° C./2 hrs and 120° C./2 hrs. The solution remains clear throughout the procedure. The volatiles are removed in vacuo and the residues are heated in an oven at 130° C./2 hrs to give a slightly yellowish solid (0.16 gm). The dried sol powder (0.013 gm) in a vial is heated to 180° C./2 hrs. It is then dissolved in methoxyethanol (0.3 ml) to give a clear colorless solution. A thin film cast on a glass plate under $N_2$ gives a clear film that shows no cracks when heated to 300° C. Separately, the dried sol (0.035 gm) is refluxed in methanol (0.5 ml) for 30 minutes and the volatiles are removed in vacuo. The residues are treated with methanol and dried at 130° C./1 hr to give solid residues (0.027 gm). The residues are then dissolved in methoxyethanol (0.4 ml) to give a clear solution. A thin cast film is clear and shows no cracks when heated to 300° C. The dried sol powder (0.025 gm) stored in a glass vial at RT over 9 months and heat-treated in an oven at 200° C./1 hr exhibits good solubility in methoxyethanol (0.5 gm) to provide a clear solution.

EXAMPLE 6

Example 6 describes the preparation of titanium phosphate sol. A homogeneous solution of titanium propoxide (0.108 gm, 0.38 mmol), phenyltrimethocxysilane (0.099 gm, 0.5 mmol), and ethylphosphate (0.138 gm, 0.76 mmol) in methoxyethanol (0.5 ml) is prepared in a vial. After addition of DI water (0.015 gm, 0.83 mmol), the solution is stirred at RT/overnight and 60° C./2 hrs. Addition of DI water (0.03 gm, 1.7 mmol) followed by stirring at 60° C./2 hrs is repeated three times (total added water, 0.105 gm, 5.8 mmol). The milky solution is then further stirred at 120° C./2 hrs to gradually form colorless precipitates. The volatiles are removed in vacuo and the residues are heated to 130° C./2 hrs in an oven to give slightly yellowish solid residues (0.136 gm). The dry sol (0.02 gm) is dissolved in methoxyethanol (0.3 ml) to give a clear colorless solution. A thin cast film on a glass plate is optically clear and shows no cracks even after heating to 300° C. The dried sol powder (0.025 gm) stored in a glass vial at RT over 9 months and heat-treated in an oven at 200° C./1 hr exhibits good solubility in methoxyethanol (0.5 gm) to provide a clear solution.

EXAMPLE 7

Example 7 describes the preparation of titanium phosphate sol by the use of octyltriethoxysilane. To a solution of titanium propxide (0.201 gm, 0.71 mmol) in methoxyethanol (0.7 ml) are added ethylphosphate (0.259 gm, 1.42 mmol) and boric acid (0.06 gm, 0.97 mmol) pre-dissolved in methoxyethanol (0.4 ml). After stirring at RT/overnight, the solution is further treated with octyltriethoxysilane (0.162 gm, 0.58 mmol) at 60° C./1 hr and 100° C./5 hrs. Finally the solution is treated with DI water (0.05 gm, 2.8 mmol) at RT/overnight and 120° C./4 hrs to obtain a milky solution. Removal of the volatiles in vacuo followed by heat-treatment at 160° C./3 hrs gives slightly yellowish powders (0.283 gm). A clear sol solution prepared by admixing the sol powder (0.024 gm), xylene (0.5 ml) and methoxyethanol (0.07 ml) generates a crack-free thin clear film on a glass plate when cast under $N_2$ and heated to 150° C.

EXAMPLE 8

Example 8 describes the preparation of zirconium phosphate sol. A homogeneous solution of zirconium butoxide (0.13 gm, 0.34 mmol), phenyltrimethoxysilane (0.091 gm, 0.46 mmol), and ethylphosphate (0.122 gm, 0.67 mmol) in methoxyethanol (0.5 ml) is prepared in a vial. After addition of a solution of boric acid (0.031 gm, 0.5 mmol) in methoxyethanol (0.2 ml), the resulting solution is stirred at RT/overnight and 100° C./2 hrs. DI water (0.05 gm, 2.8 mmol) is added and stirring is continued at 100° C./2 hrs and 120° C./2 hrs. The solution remains clear throughout the procedure. The volatiles are removed in vacuo and the residues are heated in an oven at 130° C./2 hrs to give a slightly yellowish solid (0.17 gm). The dried sol (0.033 gm) is refluxed in methanol (0.5 ml) for 30 minutes and the volatiles are removed in vacuo. The residues are treated with methanol and dried at 130° C./1 hr to give solid residues (0.027 gm). The residues are then dissolved in methoxyethanol (0.4 ml) to give a clear solution. A thin cast film is clear and shows no cracks after heating to 300° C. The dried sol powder (0.025 gm) stored in a glass vial at RT over 9 months and heat-treated in an oven at 200° C./1 hr exhibits good solubility in methoxyethanol (0.5 gm) to provide a clear solution.

EXAMPLE 9

Example 9 describes the preparation of zirconium phosphate sol. A homogeneous solution of zirconium butoxide (0.13 gm, 0.34 mmol), phenyltrimethoxysilane ((0.091 gm, 0.46 mmol), and ethylphosphate (0.122 gm, 0.67 mmol) in methoxyethanol (0.5 ml) is prepared in a vial. Treatment with DI water (total added water, 0.105 gm, 5.8 mmol) as described in example 5 gives a milky solution with colorless precipitates. The volatiles are removed in vacuo and the residues are heated to 130° C./2 hrs in an oven to give slightly yellowish solid residues (0.148 gm). The dry sol (0.02 gm) is dissolved in methoxyethanol (0.3 ml) to give a slightly hazy solution. Filtration followed by casting of the resulting clear solution on a glass plate gives an optically clear thin film that shows no cracks after heating to 300° C.

EXAMPLE 10

Example 10 describes the preparation of aluminum phosphate sol containing Au nanoparticles. A solution of aluminum s-butoxide (0.19 gm, 0.77 mmol) in methoxyethanol (0.5 ml) is prepared in a vial. It is stirred for 1 hr after addition of mercaptopropyl trimethoxysilane (0.0013 gm, 0.007 mmol). After adding phenyltrimethoxysilane (0.13 gm, 0.66 mmol) and ethylphosphate (0.14 gm, 0.77 mmol), the solution is stirred for another 1 hr. After wrapping the vial with an aluminum foil, the solution is stirred in the presence of gold (III) hydroxide (0.0035 gm, 0.014 mmol) for 3 hrs. Finally, DI water (0.065 gm, 3.6 mmol) is added and the resulting solution is stirred for 48 hrs. The solution is then exposed to sunlight while stirring to form a deep wine red solution, indicating the formation of Au nanoparticles. A thin film formed by casting on a glass plate is clear wine-red. Removal of the volatiles in vacuo followed by heat-treatment in an oven at 130° C./1 hr gives deep wine-red residues (0.18 gm). The dried sol powder (0.04 gm) is stirred in the presence of methoxyethanol (0.5 ml) and phenyltrimethoxysilane (0.01 gm) at 120° C./2 hrs to give a clear wine-red solution that shows no changes in color or optical clarity when allowed to store for over 9 months at room temperature.

EXAMPLE 11

Example 11 describes the preparation of aluminum phosphate sol containing Au nanoparticles. A mixture of aluminum phosphate sol powder prepared in Example 1 (0.023 gm), methoxyethanol (0.5 ml), phenyltrimethoxysilane (0.008 gm), and mercaptopropyltrimethoxysiale (0.0012 gm) in a vial is stirred at 120° C./2 hrs to obtain a clear solution. After wrapping the vial with an aluminum foil, it is stirred overnight in the presence of gold (III) hydroxide (0.001 gm). Exposure to sunlight while stirring followed by filtration results in the formation of a clear wine-red solution that shows no changes in color or optical clarity even after storage for over 9 months.

EXAMPLE 12

Example 12 describes the preparation of aluminum phosphate sol containing CdS nanoparticles. The dried sol powder prepared in Example 1 (0.024 gm) is admixed with cadmium acetate (0.0027 gm), phenyltrimethoxysilane (0.005 gm) and mercaptopropyltrimethoxysilane (0.0009 gm) in methoxyethanol (0.5 ml) at 100° C./2 hrs to obtain a clear colorless solution. The solution is then stirred at room temperature/overnight after addition of a solution of methylthioamide (0.00046 gm) in methoxyethanol (0.0024 gm). The resulting clear yellow solution exhibits a bright yellow emission when exposed to UV, demonstrating the formation of CdS nanoparticles.

EXAMPLE 13

Example 13 describes the preparation of aluminum phosphate sol containing CdS nanoparticles. The dried sol powder prepared in Example 2 (0.024 gm) is admixed with cadmium acetate (0.002 gm), phenyltrimethoxysilane (0.005 gm) and mercaptopropyltrimethoxysilane (0.0007 gm) in methoxyethanol (0.5 ml) at 100° C./2 hrs to obtain a clear colorless solution. The solution is then stirred at room temperature/overnight after addition of a solution of methylthioamide (0.0005 gm) in methoxyethanol (0.0027 gm). The resulting clear yellow solution exhibits a bright orange-yellow emission when exposed to UV.

EXAMPLE 14

Example 14 describes the preparation of epoxy/metal phosphate sol system containing Au nanoparticles. Aluminum phosphate/Au sol powder prepared in Example 10 (0.023 gm) is admixed with bisphenol A glycidyl ether (0.160 gm), bisphenol A propoxylate/ethoxylate (0.05 gm) and phenyltrimethoxysilane (0.007 gm), and 3-glycidoxypropyltrimethoxysilane (0.002 gm). The resulting resin/sol mixture is poured onto a glass plate and heat-cured at 50° C./1 hr+80° C./1 hr+110° C./3 hrs to give a clear wine-red film.

EXAMPLE 15

Example 15 describes the preparation of epoxy/metal phosphate nanocomposite. The titanium phosphate sol powder prepared in Example 6 (0.022 gm) is heat treated in an oven at 160° C./1 hr and dissolved in methoxyethanol (0.3 ml). It is then mixed with 3-glycidoxypropyltrimethoxysilane (0.005 gm) and bisphenol A glycidyl ether (0.020 gm). A drop of the solution on a glass plate forms a thin clear film that is then cured at 110° C./3 hrs+200° C./1 h to give a crack-free transparent film.

EXAMPLE 16

Example 16 describes the preparation of epoxy/metal phosphate sol system containing CdS nanoparticles. One-half of the aluminum phosphate/CdS sol solution prepared in Example 12 is admixed with bisphenol A glycidyl ether (0.033 gm) and bisphenol A propoxylate/ethoxylate (0.004 gm) to obtain a clear solution. The solution is then poured onto a glass plate and heated to 50° C. under $N_2$ flow to remove the volatiles. The resulting clear film is then cured in an oven at 80° C./1 hr+120° C./2 hrs to give a transparent film which exhibited a bright yellow emission when exposed to UV.

EXAMPLE 17

Example 17 describes the preparation of polyurethane/metal phosphate nanocomposite. A solution containing titanium phosphate sol powder prepared in Example 5 (0.022 gm), glycerol propoxylate (MW=1500, 0.045 gm), bisphenol A propoxylate/ethoxylate (0.02 gm), and anhydrous acetone (0.1 ml) is first prepared by stirring for 2 hrs. The solution is stirred for another 10 minutes after addition of isophorone diisocyanate (0.043 gm) and then poured onto a glass plate. After removing the volatiles under $N_2$ flow, it is cured in an oven at 50° C./1 hr+120° C./1 hr to give a transparent film.

EXAMPLE 18

Example 18 describes the preparation of acrylate/metal phosphate nanocomposite. The metal phosphate sol powder prepared in Example 6 (0.022 gm) is admixed with CN104D80 epoxy acrylate from Sartomer (0.035 gm), hydroxyethylmethacrylkate (0.007 gm), 3-(trimethoxysilyl)propyl methacrylate (0.001 gm), methoxyethanol (0.1 ml), and benzil dimethyl ketal (0.005 gm). After obtaining a homogeneous solution, it is poured onto a glass plate, removed the volatiles under $N_2$ flow, and cured by exposing to a UV lamp. The cured film is optically transparent.

Sols that are prematurely hydrolyzed/condensed in some instances have a tendency to undesirably form intractable gels during the high temperature heat treatment. In such instances, the addition of acid or base catalyst addresses this issue by facilitating the reaction and thus ensuring the formation of tractable sols that are more thermally stable. Examples of acid or base catalysts include hydrochloric acid, hydrobromic acid, ammonium hydroxide, tetraammonium hydroxide, triethyl amine, sodium hydroxide, potassium hydroxide, and pyridine.

EXAMPLE 19

Example 19 describes the preparation of aluminum phosphate sol in the presence of an HCl catalyst. A solution containing aluminum s-butoxide (0.082 gm, 0.37 mmol), phenyltrimethxoxysilane (0.092 gm, 0.46 mmol), ethylphosphate ((0.068 gm, (0.37 mmol) and methoxyethanol (0.4 gm) is prepared in a glass vial. After addition of 2% aqueous HCl (0.016 gm) and DI water (0.03 gm, 1.7 mmol), the solution is stirred overnight at room temperature and then refluxed for 5 hrs to give a clear solution. Removal of the volatiles in vacuo followed by heat treatment in an oven at 200° C./1 hr gives colorless powders (0.106 g). A mixture of the dried sol powder (0.02 gm) and metoxyethanol (0.5 gm) is refluxed for 4 hrs to give a clear solution. It is cast on a glass plate under $N_2$ and heated to 300° C. to give a clear crackfree film.

EXAMPLE 20

Example 20 describes the preparation of aluminum phosphate sol in the presence of an HCl catalyst and boric acid. A solution containing aluminum s-butoxide (0.082 gm, 0.37 mmol), phenyltrimethxoxysilane (0.092 gm, 0.46 mmol), ethylphosphate ((0.068 gm, (0.37 mmol) and methoxyethanol (0.4 gm) is admixed with boric acid (0.023 g, 0.037 mmol). After addition of 2% aqueous HCl (0.016 gm) and DI water (0.03 gm, 1.7 mmol), the solution is stirred overnight at room temperature and then refluxed for 5 hrs to give a clear solution. Removal of the volatiles in vacuo followed by heat treatment in an oven at 200° C./1 hr gives colorless powders (0.114 g). The dried sol (0.02 gm) is readily soluble in methoxyethanol (0.5 gm) at ambient temperature to give a clear solution. It is cast on a glass plate under $N_2$ and heated to 300 C to give a clear crack-free film.

EXAMPLE 21

Example 21 describes the preparation aluminum phosphate sol in the presence of a tetraethylammonium hydroxide catalyst. A solution containing aluminum s-butoxide (0.082 gm, 0.37 mmol), phenyltrimethxoxysilane (0.091 gm, 0.46 mmol), ethylphosphate ((0.068 gm, (0.37 mmol) and methoxyethanol (0.4 gm) is prepared in a glass vial. After addition of 7.5% tetraethylammonium hydroxide in methanol (0.012 gm) and DI water (0.045 gm, 2.5 mmol), the solution is stirred overnight at room temperature and then refluxed for 5 hrs to give a clear solution. Removal of the volatiles in vacuo followed by heat treatment in an oven at 200° C./1 hr gives colorless powders (0.106 g). A mixture of the dried sol powder (0.02 gm) and metoxyethanol (0.5 gm) is refluxed for 3 hrs to give a clear solution. It is cast on a glass plate under $N_2$ and heated to 300° C. to give a clear crack-free film.

EXAMPLE 22

Example 22 describes the preparation of aluminum phosphate sol in the presence of a tetraethylammonium hydroxide catalyst and boric acid. A solution containing aluminum s-butoxide (0.082 gm, 0.37 mmol), phenyltrimethxoxysilane (0.091 gm, 0.46 mmol), ethylphosphate ((0.068 gm, (0.37 mmol) and methoxyethanol (0.4 gm) is admixed with boric acid (0.023 g, 0.037 mmol). After addition of 7.5% tetraethylammonium hydroxide in methanol (0.012 gm) and DI water (0.03 gm, 1.7 mmol), the solution is stirred overnight at room temperature and then refluxed for 5 hrs to give a clear solution. Removal of the volatiles in vacuo followed by heat treatment in an oven at 200° C./1 hr gives colorless powders (0.118 g). The dried sol (0.02 gm) is readily soluble in methoxyethanol (0.5 gm) at ambient temperature to give a clear solution. It is cast on a glass plate under $N_2$ and heated to 300° C. to give a clear crack-free film.

EXAMPLE 23

Example 23 describes the preparation of aluminum phosphate sol by use of polyphosphoric acid. That is, polyphosphoric acid may be used as a phosphate precursor. A solution containing polyphosphoric acid (0.014 gm, $H_3PO_4$ equivalent ~115%), boric acid (0.01 gm, 0.16 mmol), and methoxyethanol (0.5 gm) and 2% aqueous HCl (0.006 gm) is stirred at 120° C. for 1 hr. The solution is cooled with an ice-water bath and aluminum s-butoxide (0.041 gm, 0.17 mmol) in methoxyethanol (0.14 gm) is very slowly added while stirring. Phenyltrimethoxysilane (0.07 gm, 0.35 mmol) is added after stirring for additional 1 hr at room temperature. The resulting solution is then stirred overnight at room temperature overnight and refluxed for 5 hrs to give a slightly hazy solution. Centrifugal separation of colorless precipitates (0.004 gm), removal of the volatiles in vacuo, and then heat treatment at 200° C./1 hr provide dry sol powders (0.07 gm). The dried sol (0.02 gm) in xylene (0.4 gm)/methoxyethanol (0.1 gm) is refluxed for 2 hrs to give a clear solution. Separately, the reaction of aluminum s-butoxide with polyphosphoric acid without boric acid and an HCl catalyst is also carried out. In this case, addition of the former to the latter, and vice versa, results in the formation of intractable white precipitates.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A nanocomposite comprising:
   from about 0.01% to about 80% by weight of at least one of guest metal nanoparticle and guest metal-chalcogenide nanoparticle; and
   from about 20% to about 99.99% by weight of a host metal phosphate sol made by mixing:
   at least one metal oxide, wherein the metal is a transition metal, a post-transition metal, an alkali metal, or alkaline earth metal;
   at least one phosphate precursor selected from the group consisting of alkylphosphates and polyphosphoric acid esters;
   at least one organosilane; and
   a liquid.

2. The nanocomposite of claim 1, wherein the guest metal nanoparticle comprises at least one selected from the group consisting of zero-valent metal, metal oxides, metal carboxylates, metal hydroxides, metal nitrates, metal halides, metal cyanides, and chelated metals.

3. The nanocomposite of claim 1, wherein the guest metal nanoparticle and the guest metal-chalcogenide nanoparticle comprise at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

4. The nanocomposite of claim 1, wherein the guest metal nanoparticle comprises at least one selected from the group consisting of gold hydroxide, gold acetate, gold chloride, silver acetate, silver acetylacetonate, silver citrate, silver lactate, silver nitrate, platinum acetylacetonate, platinum chloride, palladium acetylacetonate, palladium acetate, palladium hydroxide, ruthenium acetylacetonate, copper acetate, copper ethoxide, $Fe(CO)_5$, $Fe_2(CO)_9$, $Co_2(CO)_8$, $ZnX(CO)Y$, $V(CO)_6$, $Cr(CO)_6$, $Mn_2(CO)_{10}$, $Re_2(CO)_{10}$, $Ru_3(CO)_{12}$, $Mo(CO)_6$, $Ni(CO)_4$, $OS(CO)_5$, $Os_3(CO)_{12}$, $Ir_4(CO)_{12}$, $W(CO)_6$, $Tc_2(CO)_{10}$, $Ru(CO)_5$, $Rh(CO)_{12}$, $Pd(CO)_4$, $Pt(CO)_4$, and platinum-1,3-divinyl-1,1,3,3,-tetramethyldisiloxane.

5. The nanocomposite of claim 1, wherein the guest metal-chalcogenide nanoparticle comprises at least one selected from the group consisting of AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

6. The nanocomposite of claim 1, wherein the metal oxide is selected from the group consisting of aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium tri-isobutoxide oxide, iron ethoxide, tungsten ethoxide, samarium isopropoxide, iron isopropoxide, cobalt methoxyethoxide, and lanthanum methoxyethoxide;

the phosphate precursor is selected from the group consisting of methylphosphate, ethylphosphate, propylphosphate, butylphosphate, pentylphosphate, hexylphosphate, dimethylphosphate, diethylphosphate, dipropylphosphate, dibutylphosphate dipentylphosphate, methylethylphosphate, ethylbutylphosphate, ethylpropylphosphate, trimethylphosphate, triethylphosphate, tripropylphosphate, tributylphosphate, tripentylphosphate, ethyl dimethylphosphate, ethyl dibutylphosphate, polyphosphoric acid methyl ester, polyphosphoric acid ethyl ester, polyphosphoric acid propyl ester, polyphosphoric acid butyl ester, polyphosphoric acid pentyl ester, polyphosphoric acid dimethyl ester, polyphosphoric acid diethyl ester, polyphosphoric acid dipropyl ester, polyphosphoric acid dibutyl ester, diphosphoric acid methyethyl ester, diphosphoric acid ethybutyl ester, diphosphoric acid ethylpropyl ester, diphosphoric acid ethylhexyl ester, trialkyl ester of di-, tri- tetra-, penta-phosphoric acid, tetraalkyl ester of di-, tri- tetra-, penta-phosphoric acid, pentaalkyl ester of di-, tri- tetra-, penta-phosphoric acid, and hexaalkyl ester of di-, tri- tetra-, penta-phosphoric acid; and the organosilane comprises an organofunctional silane represented by Formula III:

$$(R^2)_{4-c}Si(X^2)_c \qquad \text{(III)}$$

wherein c is 1 to 4, each $X^2$ is individually an alkoxy group containing from 1 to about 4 carbon atoms, and each $R^2$ is individually a hydrogen or an organofunctional containing organic group containing from about 1 to about 24 carbon atoms including at least one from the group consisting of heterocyclic, acryloxy, cyano, phosphino, amino, amide, vinyl, epoxy, glycidoxy, alkyl, a carbon carbon triple bond containing group, mercapto, siloxy, halocarbon, and a carbon carbon double bond containing group.

7. The nanocomposite of claim 1, wherein the metal phosphate sol is made by further mixing at least one boron oxide compound selected from the group consisting of boric acid, alkoxy boron compounds, hydrocarbyl boric acids, hydrocarbyl hydroxy boron alkoxides, and hydroxy boron alkoxides.

8. The nanocomposite of claim 1, wherein the phosphate precursor further comprises at least one selected from the group consisting of polyphosphoric acid, phosphonic acids, phosphinic acids, phosphonic acid esters, and phosphinic acid esters.

9. The nanocomposite of claim 1, wherein the metal phosphate sol is made by further mixing about less than about 5% by weight of at least one acid or base catalyst selected from the group consisting of hydrochloric acid, hydrobromic acid, ammonium hydroxide, tetraethylammonium hydroxide, triethylamine, sodium hydroxide, and potassium hydroxide.

10. The nanocomposite of claim 1, wherein the phosphate precursor further comprises at least one selected from the group consisting of phosphonic acid, methyl phosphonic acid, ethyl phosphonic acid, propyl phosphonic acid, butyl phosphonic acid, pentyl phosphonic acid, hexyl phosphonic acid, phosphinic acid, methyl phosphinic acid, ethyl phosphinic acid, propyl phosphinic acid, butyl phosphinic acid, pentyl phosphinic acid, hexyl phosphinic acid, phosphonic acid methyl ester, phosphonic acid ethyl ester, phosphonic acid propyl ester, phosphonic acid butyl ester, phosphonic acid pentyl ester, phosphonic acid dimethyl ester, phosphonic acid diethyl ester, phosphonic acid dipropyl ester, phosphonic acid dibutyl ester, phosphonic acid methyethyl ester, phosphonic acid ethybutyl ester, phosphonic acid ethylpropyl ester, phosphonic acid ethylhexyl ester, phosphinic acid methyl ester, phosphinic acid ethyl ester, phosphinic acid propyl ester, phosphinic acid butyl ester, phosphinic acid pentyl ester, phosphinic acid dimethyl ester, phosphinic acid diethyl ester, phosphinic acid dipropyl ester, phosphinic acid dibutyl ester, phosphinic acid methyethyl ester, phosphinic acid ethybutyl ester, phosphinic acid ethylpropyl ester, and phosphinic acid ethylhexyl ester.

11. A dried nanocomposite of the nanocomposite of claim 1 made by removing the liquid phase of the nanocomposite, the dried nanocomposite comprising less than about 0.5% by weight of water.

12. A method of making a nanocomposite, comprising;
mixing at least one of metal nanoparticle and metal-chalcogenide nanoparticle; at least one metal oxide, wherein the metal is a transition metal, a post-transition metal, an alkali metal, or alkaline earth metal; at least one phosphate precursor selected from the group consisting of alkylphosphates and polyphosphoric acid esters; at least one organosilane; and a liquid to provide the nanocomposite.

13. The method of claim 12, wherein the method further comprises mixing at least one boron oxide compound selected from the group consisting of boric acid, alkoxy boron compounds, hydrocarbyl boric acids, hydrocarbyl hydroxy boron alkoxides, and hydroxy boron alkoxides to provide the nanocomposite.

14. The method of claim 12, wherein the method further comprises mixing about less than about 5% by weight of at least one acid or base catalyst selected from the group consisting of hydrochloric acid, hydrobromic acid, ammonium hydroxide, tetraethylammonium hydroxide, triethylamine, sodium hydroxide, and potassium hydroxide.

15. The method of claim 12, wherein one of:
the metal oxide, the phosphate precursor, and the liquid are initially combined, followed by adding at least one of the metal nanoparticle and metal-chalcogenide nanoparticle, and further followed by adding the organosilane;
the metal oxide, the phosphate precursor, the organosilane, and the liquid are initially combined, followed by adding at least one of the metal nanoparticle and metal-chalcogenide nanoparticle; or
the metal oxide, at least one of the metal nanoparticle and metal-chalcogenide nanoparticle, and the liquid are initially combined, followed by adding the phosphate precursor, and further followed by adding the organosilane.

16. A metal-chalcogenide nanocomposite made by chalcogenizing the guest metal nanoparticle of the nanocomposite of claim 1.

17. The metal-chalcogenide nanocomposite of claim 16, wherein the metal-chalcogenide nanocomposite comprises at least one selected from the group consisting of AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

18. The metal-chalcogenide nanocomposite of claim 16, wherein chalcogenization is carried out by contacting the nanocomposite with a chalcogenizing agent.

19. The metal-chalcogenide nanocomposite of claim 16, wherein the chalcogenizing agent is at least one of:
   1) a sulfirization agent, a selenization agent, or a tellurization agent;
   2) $H_2S$, $H_2Se$, or $H_2Te$;
   3) a labile metal-chalcogenide or elemental chalcogen; or
   4) at least one selected from the group consisting of $Al_2S_3$, $Al_2Se_3$, $Al_2Te_3$, $Na_2S$, $Na_2Se$, $Na_2Te$, CaS, CaSe, CaTe, FeS, FeSe, FeTe, $TiS_2$, $TiSe_2$, $TiTe_2$, $ZrS_2$, $ZrSe_2$, $ZrTe_2$, $B_2S_3$, $B_2Se_3$, $B_2Te_3$, S, Se, Te, thioamide, thioacetamide, thiourea, bis-(trimethylsilylsulfide), and carbon disulfide.

20. A dried metal-chalcogenide nanocomposite of the metal-chalcogenide nanocomposite of claim 16 made by removing the liquid phase of the metal-chalcogenide nanocomposite, the dried metal-chalcogenide nanocomposite comprises less than about 0.5% by weight of water.

21. A method of making a metal-chalcogenide nanocomposite, comprising:
   mixing at least one guest metal nanoparticle; at least one metal oxide, wherein the metal is a transition metal, a post-transition metal, an alkali metal, or alkaline earth metal; at least one phosphate precursor selected from the group consisting of alkylphosphates and polyphosphoric acid esters; at least one organosilane; and a liquid to provide a host-guest metal phosphate sol, and chalcogenizing the host-guest metal phosphate sol to provide the metal-chalcogenide nanocomposite.

* * * * *